W. G. FOARD.
SIGN.
APPLICATION FILED FEB. 12, 1913.

1,085,200.

Patented Jan. 27, 1914.

Witnesses:

Inventor,

UNITED STATES PATENT OFFICE.

WILLIAM G. FOARD, OF KALAMAZOO, MICHIGAN.

SIGN.

1,085,200.  Specification of Letters Patent.  Patented Jan. 27, 1914.

Application filed February 12, 1913. Serial No. 747,977.

*To all whom it may concern:*

Be it known that I, WILLIAM G. FOARD, a citizen of the United States, residing at the city of Kalamazoo, county of Kalamazoo, and State of Michigan, have invented certain new and useful Improvements in Signs, of which the following is a specification.

My invention relates to improvements in signs and more particularly to that class of signs known as "illuminated signs" in which the letters or characters are formed of lenses inserted in an opaque casing or face plate.

The objects of my invention are to provide in a sign of this class improved means for securing the lenses to its casing or face; in which the parts can be economically manufactured, easily assembled and when assembled the possibility of the lenses becoming loosened and falling out, or, being broken by becoming unduly tightened in the casing, due to unequal expansion and construction of parts under varying climatic conditions will be practically avoided.

Further objects relating more particularly to structural details will more definitely appear in the description to follow.

I accomplish these objects by the devices and means described in this specification and definitely pointed out in the claims.

Figure 1:
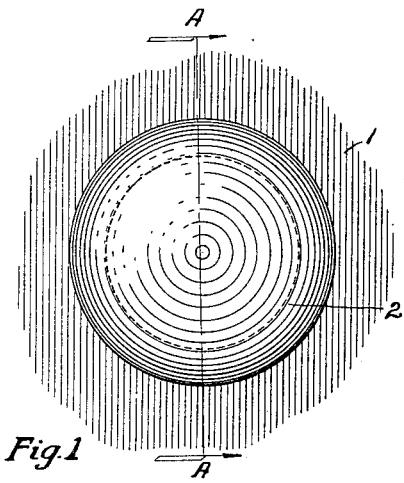
Figure 2:
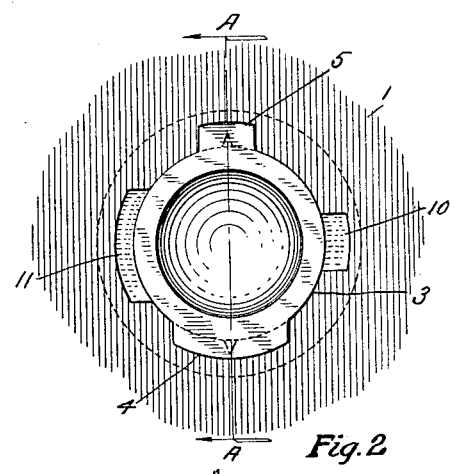
Figure 4:
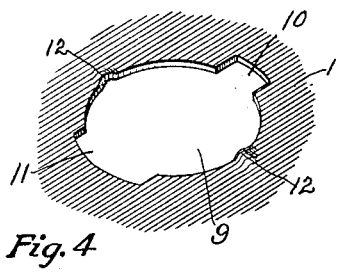
Figure 3:
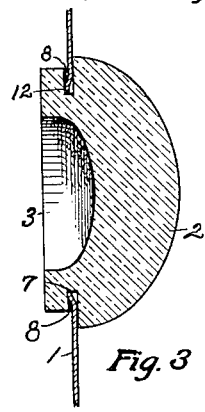
Figure 5:
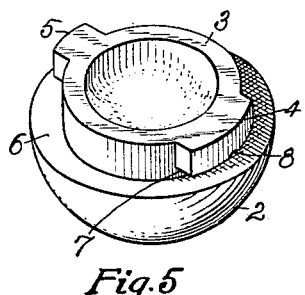
Figure 6:
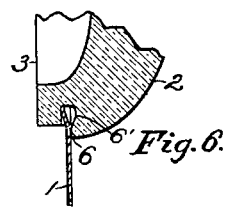

Structures embodying these features are clearly illustrated in the accompanying sheet of drawings forming a part of this specification, in which:

Figure 1 is an elevation of a portion of the outside of a sign casing, showing a single lens in position therein. Fig. 2 is a reverse elevation of the same. Fig. 3 is a sectional elevation taken on lines A, A, of Figs. 1 and 2, looking in the direction of the little arrows at the end of the section lines. Fig. 4 is a reverse perspective view of a portion of the casing showing one of the apertures for the insertion of the lens. Fig. 5 is a reverse perspective view of the lens. Fig. 6 is a sectional detail showing a slight modification in the structure of the lens which will be again referred to.

In the drawing similar reference characters refer to the same parts throughout the several views.

Referring to these parts, 1 is a portion of the sheet metal casing or face plate usually employed in the construction of this class of signs. As the manner of constructing the frame, or the manner of securing the casing to the frame, or the illumination of the sign forms no part of this invention, I have not illustrated or described either herein, except so far as the aperture which I have shown in said casing is concerned.

The lens 2 is made preferably spheroidal on its outer face, but may be made any desired shape. This lens is provided with a cylindrical shank 3, which is also provided with the retaining lugs 4 and 5 projecting from its periphery at, preferably diametrically opposite points as shown in Figs. 2 and 5. These lugs are preferably of different sizes. Lug 4 has a greater circumferential pitch than lug 5, while lug 5 projects a greater radial distance from the periphery of the shank 3 than does lug 4, the functions of which will be hereafter explained. The inner face of the lens outside of its shank forms a shoulder 6 to fit close against the face of the casing 1, as shown in Figs. 3 and 5. An annular recess 7 is formed between the shoulder 6 and lugs 4 and 5, of sufficient thickness to allow the metal casing to pass through freely. Upon the inner face of these lugs next to the shoulder 6, is formed a slight niche, or depression 8, extending radially from the outside periphery thereof to the shank 3, as shown in Figs. 3 and 5, the functions of which will be hereafter explained.

The casing 1 is provided with circular openings 9, which are arranged in any suitable manner to make up the desired characters on the sign. These openings are adapted to receive the shank of the lens and are provided with notches or recesses 10 and 11, corresponding in shape to that of the lugs 4 and 5 on the shank of the lens. These openings should be sufficiently large to admit the free and easy insertion of the shank 3 with its lugs 4 and 5. On the inner face of the casing and at diametrically opposite sides of the opening 9, are small projections 12, struck up from the metal, as shown in Figs. 3 and 4. The apertures in the casing and the little projections 12 can all be formed at one operation of a punch, thus making them very economical to manufacture.

In assembling the lenses, the shank 3 is passed into the circular opening 9 until the shoulder 6 of the lens engages the face of the casing 1, when it is given substantially a quarter turn, or until the little depressions 8 in the lugs 4 and 5 engage the little projections 12, when the lens becomes seated and will not rotate except sufficient force is applied to overcome the friction between the lens and casing, caused by the impinging of the projections 12 with the lugs 4 and 5. The formation of the projections 12 admits of their exerting a spring pressure between the face of the lens and lugs sufficient to hold the lens close to the casing at all times, and also to compensate for expansion of the thickness of the casing under varying climatic changes which is sufficient to prevent the breaking of the shank of the lens, or the lugs therefrom from any such cause. In large signs where thicker metal is used for the casing, with correspondingly larger lenses, the metal is apt to become warped or sprung at or near the edge of the aperture, or the edge of the aperture may have a bur on it, either of which will prevent the lens fitting close against the casing. To provide against this, I make an annular recess 6' next to the shank in the face or shoulder 6 of the lens as shown in Fig. 6, which allows the outer edge of the lens to fit more closely against the casing. As a further safeguard against the lenses becoming loosened and falling from the casing, by reason of defective, or a misfit of parts, or improper assembling, I have provided lugs of different sizes on the shank of the lens. In case the projections 12 should become impaired from any cause, or in assembling the lens should be inadvertently turned so far as to allow the lugs to pass entirely by these projections, the lug 4 by reason of its greater width could not pass through notch 10, and the lug 5 having greater radial projection could likewise, not pass through notch 11. Furthermore, in case the function of the projections 12 should become wholly impaired, or they were not used at all, so that the lens was allowed to turn freely in its circular opening 9, the preponderance of weight in lug 4 over that of lug 5 would have a tendency to keep the heavier lug at the lower side, the notches for the insertion of these lugs being always placed in a horizontal plane, as shown in Fig. 2, thus practically obviating the liability of the lenses being displaced from the casing from any cause due to the action of the elements in the contraction or expansion of parts, or the swinging and swaying of the sign. To provide against the breaking of the shank of the lens, due to contraction of the metal casing about said shank, the opening is sufficiently larger than the shank to allow for the maximum shrinkage of the metal before causing any undue pressure on said shank.

When the lens is screwed into the casing, (which is the most common method of fastening them), the screw shank must necessarily fit the opening practically tight, especially when screwed down to the shoulder of the lens in order to provide against any looseness of the lens in the casing, then when the great shrinkage of the metal of the casing about the shank occurs, (which is very sure to occur in most climates,) the shank is very apt to break from this cause. My invention obviates this very annoying feature entirely.

While I have illustrated and described my invention in its preferred construction, I am aware that it may be greatly varied in its details of construction without departing from the essential features of the invention.

Having thus described my invention, what I claim as new and desire to secure by Letters Patent is:

1. A sign comprising a casing or face-plate of sheet metal provided with a substantially circular opening having notches of varying sizes at opposite sides thereof arranged in substantially a horizontal plane with reference to the center of said opening and projections struck up from the outer side of said casing at opposite sides of said opening, a lens provided with a shoulder adapted to contact with the face of the casing and provided with an annular recess or depression in said shoulder, said lens also being provided with a circular shank having retaining-lugs of varying sizes at opposite sides thereof and an annular recess between the inner faces of said lugs and said shoulder, the inner faces of said lugs being provided with niches adapted to engage the projections on said casing to seat the lens and hold its shoulder in close contact with the casing and prevent rotation of said lens.

2. A sign comprising a sheet metal casing provided with a substantially circular opening having notches of different sizes at opposite sides thereof and projections from the face of the casing at opposite sides of said opening, a lens having a shoulder and circular shank, said shank being provided with retaining lugs of different sizes and an annular recess between said lugs and shoulder and adapted to be inserted in the opening in said casing, said lugs being provided with niches to engage with said projections on the casing to seat the lens and hold it in close contact with the casing and prevent rotary displacement of said lens.

3. A sign comprising a casing or face plate provided with substantially a circular opening having notches at opposite sides thereof, a lens having a shoulder to engage the face of the casing and a circular shank adapted to turn in said opening, said shoulder being provided with an annular recess or depression between its outer edge and the shank, said shank provided with retaining lugs adapted to engage the face of the casing and suitable means to seat the lens and hold it in close contact with the casing by yielding pressure between the inner face of said lugs and casing to prevent its rotary displacement.

4. A sign comprising a casing of sheet metal provided with substantially a circular opening having notches of different sizes at opposite sides thereof arranged in substantially a horizontal plane with relation to the position in which the sign is to be placed, a lens provided with a shoulder to contact with the casing and a shank having retaining lugs of different sizes adapted to engage said casing and be easily inserted and turn in said opening, said lugs being of such a size and shape that neither will pass through the notch in the casing adapted to receive its opposite mate, the heavier of said lugs always seeking and maintaining the lowest point by gravity, thereby practically obviating the registry of said lugs with their respective notches in the casing except through force applied for such purpose.

5. A sign comprising a casing of sheet metal provided with a substantially circular opening having notches cut from its periphery, a lens provided with a shoulder to engage said casing, and a shank provided with retaining lugs adapted to engage said casing and be easily inserted and turned in said opening, and suitable means between the inner face of said lugs and casing whereby the shoulder of said lens shall be held in close contact with the face of the casing, and a preponderance of weight on one side of the shank so that said weight shall gravitate to the lowest point thereby keeping said lugs from registering with their respective notches in the casing when said weight is at its lowest position.

In witness whereof, I have hereunto set my hand and seal in the presence of two subscribing witnesses.

WILLIAM G. FOARD. [L. S.]

Witnesses:
 JOHN H. BURKE, Jr.,
 GERTRUDE E. HEATH.

---

Copies of this patent may be obtained for five cents each, by addressing the "Commissioner of Patents, Washington, D. C."